United States Patent
Wicks et al.

(10) Patent No.: US 11,420,883 B2
(45) Date of Patent: Aug. 23, 2022

(54) METHOD AND SYSTEM FOR CONTROLLING ODOR IN WATER SYSTEM

(71) Applicant: CHEMTREAT, INC, Glen Allen, VA (US)

(72) Inventors: Joel Wicks, Parkville, MO (US); James Beck, Urbandale, IA (US); John Richardson, Hanover, VA (US); John Burchtorf, Boise, ID (US)

(73) Assignee: CHEMTREAT, INC, Glen Allen, VA (US)

( * ) Notice: Subject to any disclaimer, the term of this patent is extended or adjusted under 35 U.S.C. 154(b) by 231 days.

(21) Appl. No.: 16/643,249

(22) PCT Filed: Aug. 30, 2018

(86) PCT No.: PCT/US2018/048842
§ 371 (c)(1),
(2) Date: Feb. 28, 2020

(87) PCT Pub. No.: WO2019/046574
PCT Pub. Date: Mar. 7, 2019

(65) Prior Publication Data
US 2020/0255304 A1 Aug. 13, 2020

Related U.S. Application Data

(60) Provisional application No. 62/551,952, filed on Aug. 30, 2017.

(51) Int. Cl.
C02F 1/28 (2006.01)
B01J 20/24 (2006.01)
(Continued)

(52) U.S. Cl.
CPC ............... *C02F 1/286* (2013.01); *B01J 20/24* (2013.01); *C02F 2101/101* (2013.01);
(Continued)

(58) Field of Classification Search
None
See application file for complete search history.

(56) References Cited

U.S. PATENT DOCUMENTS 5,152,896 A * 10/1992 Mazet .................. B01J 47/12
210/500.29
8,647,566 B2 * 2/2014 Tsui ....................... C02F 11/00
422/5

(Continued)

FOREIGN PATENT DOCUMENTS

| CN | 101209868 A | 7/2008 |
|---|---|---|
| CN | 106809904 A | 6/2017 |

(Continued)

OTHER PUBLICATIONS https://newengland.com/today/food/main-dishes/new-england-food/harvard-beets/ (Year: 2013).*

(Continued)

*Primary Examiner* — Chester T Barry
(74) *Attorney, Agent, or Firm* — Oliff PLC

(57) ABSTRACT

Methods and systems of controlling odor in. water by adding a humic composition to the water. The humic composition cm adsorb or otherwise neutralize malodorous compounds such as hydrogen sulfide, ammonia, and mercaptans. The methods are useful in food and. agricultural industries where the water may come in contact with food items.

13 Claims, 5 Drawing Sheets

(51) Int. Cl.
  *C02F 101/10* (2006.01)
  *C02F 101/16* (2006.01)
  *C02F 103/32* (2006.01)

(52) U.S. Cl.
  CPC ...... *C02F 2101/16* (2013.01); *C02F 2101/40* (2013.01); *C02F 2103/32* (2013.01); *C02F 2209/005* (2013.01); *C02F 2209/265* (2013.01); *C02F 2303/02* (2013.01)

(56) References Cited

U.S. PATENT DOCUMENTS

| | | | | |
|---|---|---|---|---|
| 10,267,536 | B1* | 4/2019 | Templin | F24H 9/0042 |
| 2004/0228828 | A1* | 11/2004 | Myrowich | B32B 9/02 |
| | | | | 424/76.2 |
| 2006/0283811 | A1* | 12/2006 | Unhoch | C02F 1/68 |
| | | | | 210/749 |
| 2012/0213662 | A1 | 8/2012 | Matheis | |
| 2015/0037274 | A1* | 2/2015 | Walia | C02F 1/286 |
| | | | | 424/76.8 |
| 2018/0061205 | A1* | 3/2018 | Shaffer | G01N 33/1886 |
| 2018/0077938 | A1* | 3/2018 | Meeder | A01N 65/03 |
| 2018/0112014 | A1* | 4/2018 | Burke | C08B 37/0015 |
| 2018/0255785 | A1* | 9/2018 | Unhoch | A01N 59/16 |

FOREIGN PATENT DOCUMENTS

| | | | |
|---|---|---|---|
| CN | 206232408 U | | 6/2017 |
| JP | H11277070 A | | 10/1999 |
| JP | 2002126060 A | * | 5/2002 |
| JP | 4732575 B2 | | 4/2011 |
| KR | 101340595 B1 | * | 12/2013 |
| WO | 2005100267 A1 | | 10/2005 |

OTHER PUBLICATIONS

Translation of description of JP 2002126060A, Dec. 10, 2021 (Year: 2021).*
Translation of description of KR-101340595-B1, Dec. 10, 2021 (Year: 2021).*
International Searching Authority, International Search Report, dated Jan. 23, 2019, pp. 6.
International Searching Authority, Written Opinion of the International Searching Authority, dated Jan. 23, 2019, pp. 12.

* cited by examiner

METHOD AND SYSTEM FOR CONTROLLING ODOR IN WATER SYSTEM

BACKGROUND

Odor control may be useful in water systems where, for example, the water includes organic material that decomposes to produce malodorous compounds such as hydrogen sulfide and ammonia. Examples of such water systems include those in food and agricultural industries where water streams are in contact with food products and collect organic matter that decomposes.

By way of example, in the processing of sugar beets to produce sugar, a large amount of water is used in extraction of the sucrose molecule from the beets. Other non-sugar organics as well as inorganic molecules are extracted from the beets in the diffusion process which must be removed, as much as possible, in a purification process that concentrates the sugar. Many soluble organic and inorganic substances pass through purification and filtration and make their way to evaporation where the sugar juice (liquor) is concentrated from approximately 14RDS to approximately 60RDS through multiple effect evaporators. From the second evaporator to the last effect, vapor from the previous effect is the heat source for that body evaporator as well as "pans" which super saturate the thickened juice to ready for crystallization. Condensed vapors add volume of water to the factory's water balance necessarily from the beets containing approximately 70% water. Some of this condensate is used for diffusion and "draft" in the process, some is lost to barometric condensers as a makeup source to the cooling system and some is lost internally from other uses. Depending on how the factory is set up, a portion of the vapor condensate can be stored in ponds or lagoons for possible re-use or makeup to other process. Some condensate may also be used for makeup to the flume system.

The flume system carries beets into the factory and is used to wash the beets from dirt and debris before introduction to the slicers. This flume water is heavily laden with dirt, organic matter, lime, sugars and micro-organisms. In some cases, the dirt is removed from the flume loop by clarification and/or settling ponds. Underflow from the flume clarifier can be processed through a mud removal process or sent to a separate pond for settling.

The water use and recovery system of a sugar beet factory or other produce washing system is shown schematically in FIG. 1, in which vegetables are introduced and washed with water before the vegetables are processed, e.g., to produce sugar. The wash and/or flume water is then stored in one or more ponds or lagoons. Some of the water from the lagoons can be later re-used in the wash process together with fresh make-up water for subsequent wash cycles.

These holding ponds and lagoons are typically stagnant water that can eventually become septic in the absence of aeration or chemical treatment. In the various storage ponds/lagoons, the biological oxygen demand (BOD) and chemical oxygen demand (COD) provided by the high amounts of organics from the processing and washing is consumed anaerobically and aerobically from bacteria, etc. At the end of the beet campaign, normally late winter to mid spring, the inventory of the ponds is subject to warming. This dramatically increases the microbial activity and odors liberated from this activity. The strength of the organics and bacterial load varies depending on the source of the pond inventory. This leads to various odors and strengths of odors liberated.

SUMMARY

In one aspect, this disclosure provides methods and systems for controlling odor in water by adding a humic composition to the water. The humic composition can adsorb or otherwise neutralize malodorous compounds such as hydrogen sulfide, ammonia, and mercaptans. The methods are useful in food and agricultural industries where the water may come in contact with food items.

DETAILED DESCRIPTION OF EMBODIMENTS

Figure 1:
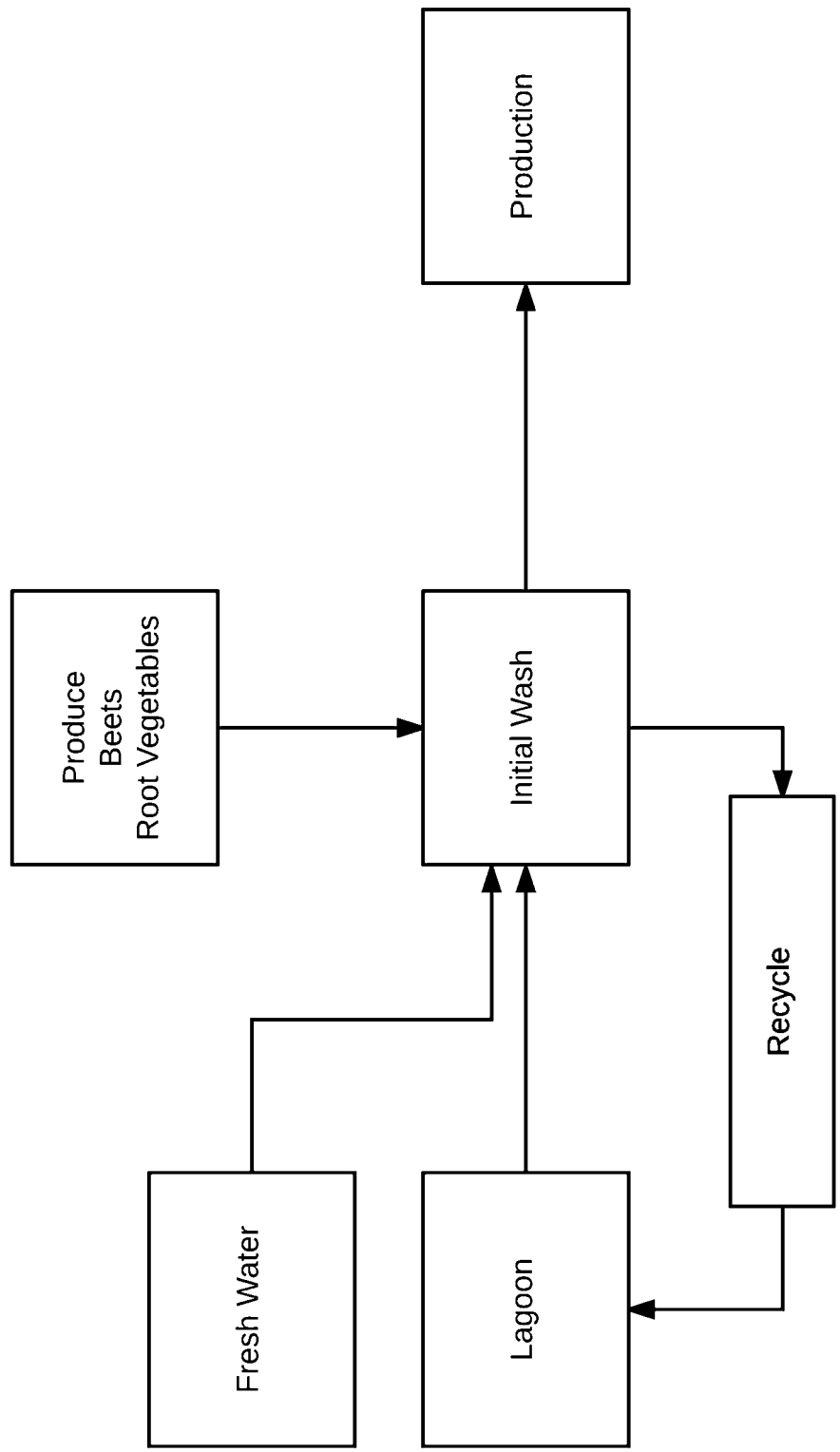
FIG. 1 is a schematic diagram of a washing water system in a beet sugar factory or other produce process.

The methods, systems, and compositions described herein are useful for controlling odor in water systems. Examples of water systems where odor control may be desirable include those in food and agricultural industries including ponds and lagoons used to store water in sugar beet factories and the processing of other produce, particularly root vegetables (potatoes, beets, carrots, etc.).

The compositions that are useful to control odor are humic compositions that include humus or material derived from humus. Humus is organic matter that is present in soils, e.g., from decomposed plant or animal material. The humus may include humic acids, carbon, tannins, lignin and/or soil nutrients.

The humic composition can be a liquid composition such as a solution, slurry, or emulsion, which optionally may include stabilizing agents or binding agents that inhibit settling of the solids. The humic composition can include humic particles that may be porous and have a relatively high surface area. The humic composition useful in these methods can have an elevated carbon content such as, for example, more than 10%, from 10% to 40%, from 15% to 30%, and from 20% to 25%, as weight percent of elemental carbon of the weight of solids. It is believed that these types of media can act as effective odor control agents because they can adsorb and thereby neutralize malodorous compounds such as hydrogen sulfide, mercaptans, and ammonia that are dissolved in the water.

The liquid humic composition can include a solids content in the range of, for example, from 0.5 to 25 wt. % solids, from 2 to 15 wt. % solids, or from 3 to 10 wt. % solids. The liquid humic composition can have a pH of, for example, from 6 to 10, from 7 to 9, or from 7.5 to 8.5.

Advantageously, the humus-containing composition is derived from natural sources and can be certified for use in food industry applications where the composition may be used in water that contacts food. For example, advantageously, the humus-containing composition can be certified as Passover Kosher compliant, GRAS certified, and/or otherwise certified for food contact for the dosage amounts described herein. In one aspect, this can be achieved by formulating a liquid humus-containing composition to be substantially free of added suspension agents, i.e., less than 1 wt. % of solids, and preferably less than 0.1 wt. % of solids.

Examples of a suitable humus-containing slurry are sold as OC9104 and OC91041 (Organic Product Company; Groveland, Fla.). These are humic slurry compositions derived from naturally occurring organic materials. They can have, for example, a 4% solids content, a dark brown appearance, a specific gravity of 1.04, and a pH of 8.00.

The humic composition can be added to a water system to control odors. The humic composition can be added to a stream of flowing water, and may also be added to substantially still water (i.e., minimal current in which added solids readily settle to the bottom) or stagnant water, e.g., holing areas such as pools, tanks, ponds, or lagoons. The water may have a noticeable odor before the humic composition is added, which can be caused by malodorous compounds dissolved in the water such as hydrogen sulfide, ammonia, and/or mercaptans. For example, the level of any one of these compounds dissolved in the water may be in the range of from 1 to 200 ppm, from 5 to 200 ppm, or from 20 to 50 ppm. The BOD level may be in the range of from 1,000 to 50,000, from 5,000 to 20,000, or from 8,000 to 15,000. BOD is measured by standard method 5210B (5-Day BOD test).

The humic composition can be fed or applied to the water by metering the composition by a pump, drip feed/siphoning (i.e., free flowing from a container), slug feed (treating with an initial dosing followed by optional continuous or semi-continuous maintenance dosages), broadcast (spraying over the water or land, e.g., with a hose/nozzle, a water truck, a crop dusting airplane, or the like), recirculating the water and adding the composition (e.g., pulling a portion of the water to be treated, adding the composition to the pulled water, and then returning the water), etc. After treatment, the amount of any one of the detectable malodorous compounds may be reduced by 95% or more, and preferably to a detectable amount of less than 5 ppm, less than 2 ppm, less than 1 ppm, or less than 0.1 ppm.

Figure 2:
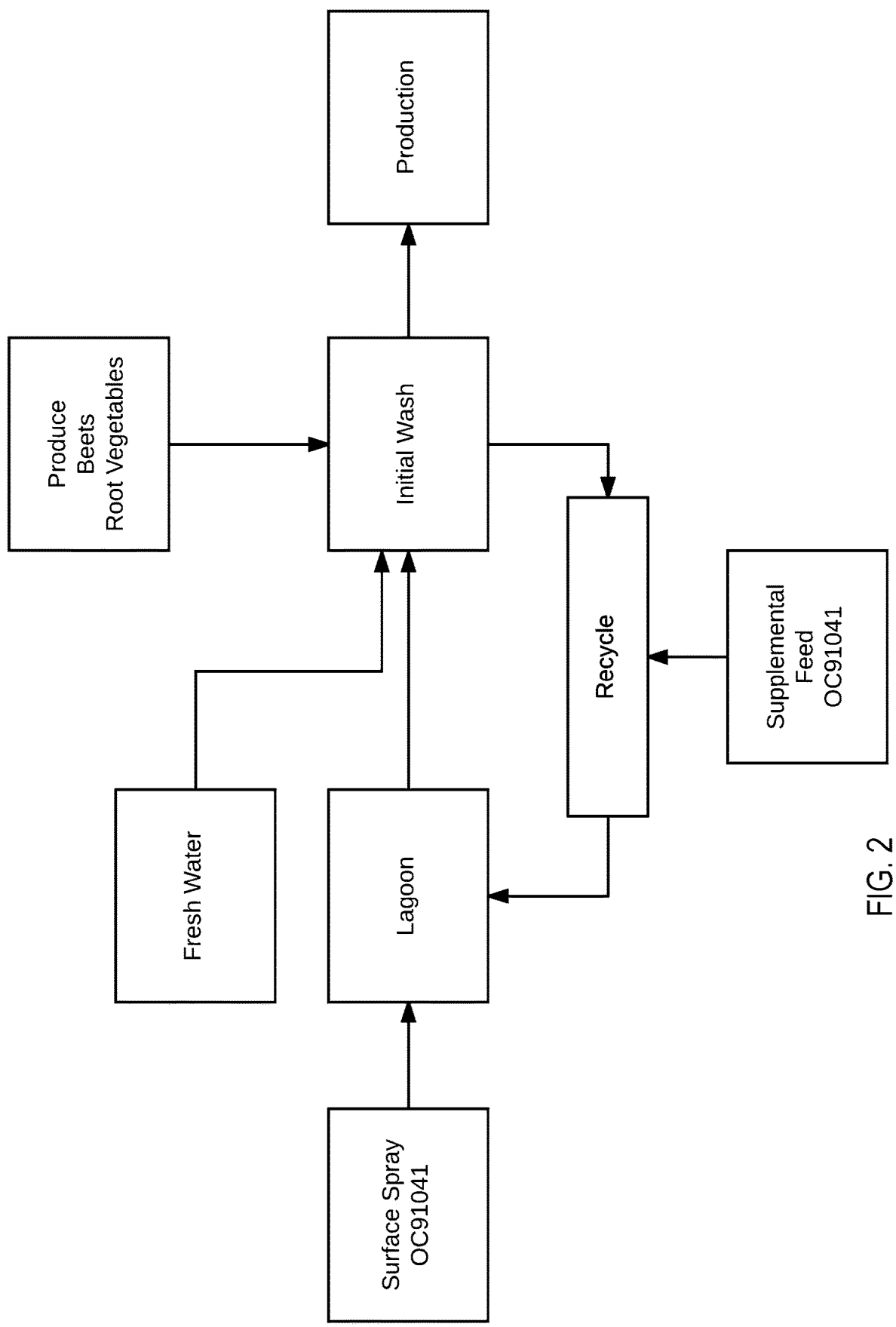
FIG. 2 is a schematic diagram of one embodiment of a water system in which a humic composition is added to control odor.

FIG. 2 illustrates one embodiment of the invention where OC91041 can be added in a water use and recovery system of a sugar beet factory or other produce washing system. FIG. 2 is the same as the factory described above in connection with FIG. 1, except the humic composition is introduced into the water system to control odor. As shown, the OC91041 humic composition is sprayed over the surface of the still lagoon that stores the used wash water and can also be optionally metered into the flowing recycle water that feeds the lagoon. The spraying application of the humic composition can constitute an initial dosing or an intermittent dosing that is used to reduce high odor levels, and metering the humic composition to the recycle stream can constitute a maintenance dosing that is used to maintain low odor levels. As shown in FIG. 2, at least a portion of the water from the lagoon is recycled to the wash process for subsequent wash cycles. The humic compositions that can be GRAS or Passover Kosher certified are particularly useful for treating water in these types of systems where the water contacts food products downstream from the point where the humic composition is added.

The humic composition can be applied to the water in dosage amounts in the range of, for example, from 0.1 ppm (wt. solids/wt. water) to 100 ppm, from 0.5 ppm to 25 ppm, or from 2 ppm to 10 ppm. Similarly, a liquid humic composition can be applied to the water in dosage amounts in the range of, for example from 1 ppm (vol. slurry/vol. water) to 1,000 ppm, from 5 ppm to 500 ppm, from 10 ppm to 100 ppm, or from 20 ppm to 60 ppm. Where the humic composition is added to a pool, lagoon, or tank the dosage amount is calculated based on the volume or weight of water contained in the holding volume, and where the humic composition is added to a flowing water stream the dosage amount is calculated based on the volumetric or mass flow rate of the water.

Figure 3:
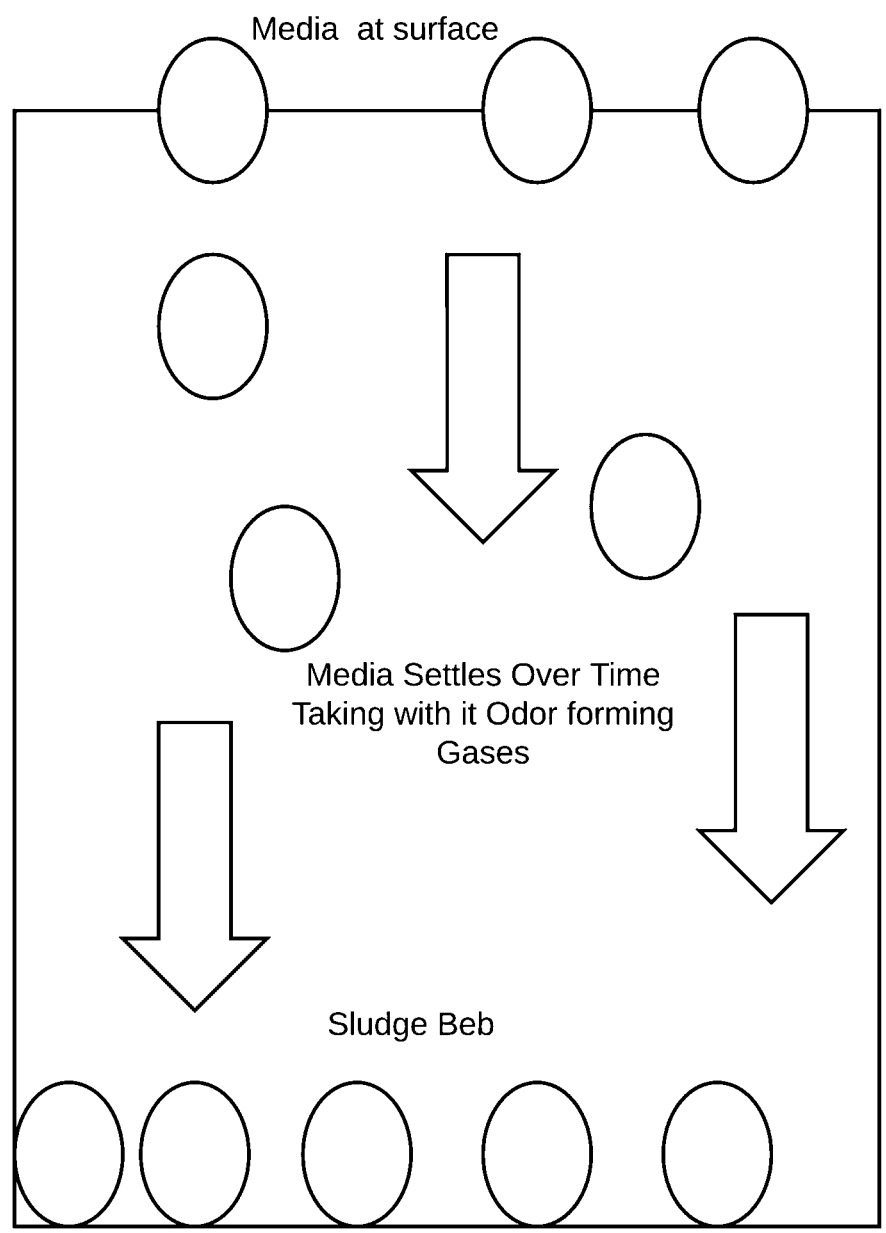
FIG. 3 is a schematic diagram illustrating a proposed mechanism of a humic composition in adsorbing odor compounds in a lagoon or pond.

It was discovered that ponds and lagoons can be very effectively treated by spraying a humic composition over the surface of the water. Spraying can be achieved by pumping the humic composition through a nozzle and distributing the spray over most of the surface area of the pond or lagoon, and preferably at least substantially the entire surface area (e.g., over 90% of the surface area). As shown schematically in FIG. 3, this application technique allows the humic particles to settle to the bottom of the pond over time. It is believed that the settling process allows the humic particles to adsorb malodorous compounds (e.g., $H_2S$, ammonia) throughout the pond, effectively scrubbing those compounds from the pond. Furthermore, to the extent that active sites remain on the humic particles that are not bonding with or interacting with the malodorous compounds, those active sites will continue to provide efficacy in removing odors after the humic particles have settled to the bottom of the pond when new water is added to the pond or as additional $H_2S$ is generated.

It is believed that the active sites in the humic composition may be provided by compounds such as lignin and humic acids which include multiple active carbon sites to which hydrogen sulfide and ammonia can bond. For example, each lignin molecule contains seven to nine carbon-oxygen and oxygen-hydrogen open bonding sites, which allows lignin to act as an absorbent sponge for odor-producing molecules. Once sulfur in the water binds onto the high-reactivity humic acid or lignin material, the molecule absorbs it. Then the compound binds and locks itself in this molecule and is not available to form an odor-bearing sulfur compound. The extreme size of these high-reactivity molecules allows them to absorb large quantities of odor-causing compounds. Any active carbon sites that remain once the humic media has settled as bottom sludge will continue to provide odor reduction even once the application of the humic composition to the water has ceased.

It can also be advantageous to allow the sprayed composition to settle as sludge at the bottom of the pond because the supernatant or water above the sludge that has been formed will have a relatively low amount of the humic composition. In embodiments described herein, this supernatant can then be drawn off of the pond and re-used. The supernatant may have a low concentration of the humic composition, e.g., less than 20 ppm (wt. humic solids/wt. water), less than 10 ppm, or less than 1 ppm. Additionally, the relative safety of the humic composition remaining in the supernatant advantageously allows the supernatant to be re-used in applications in which the supernatant water contacts food items.

Figure 4:
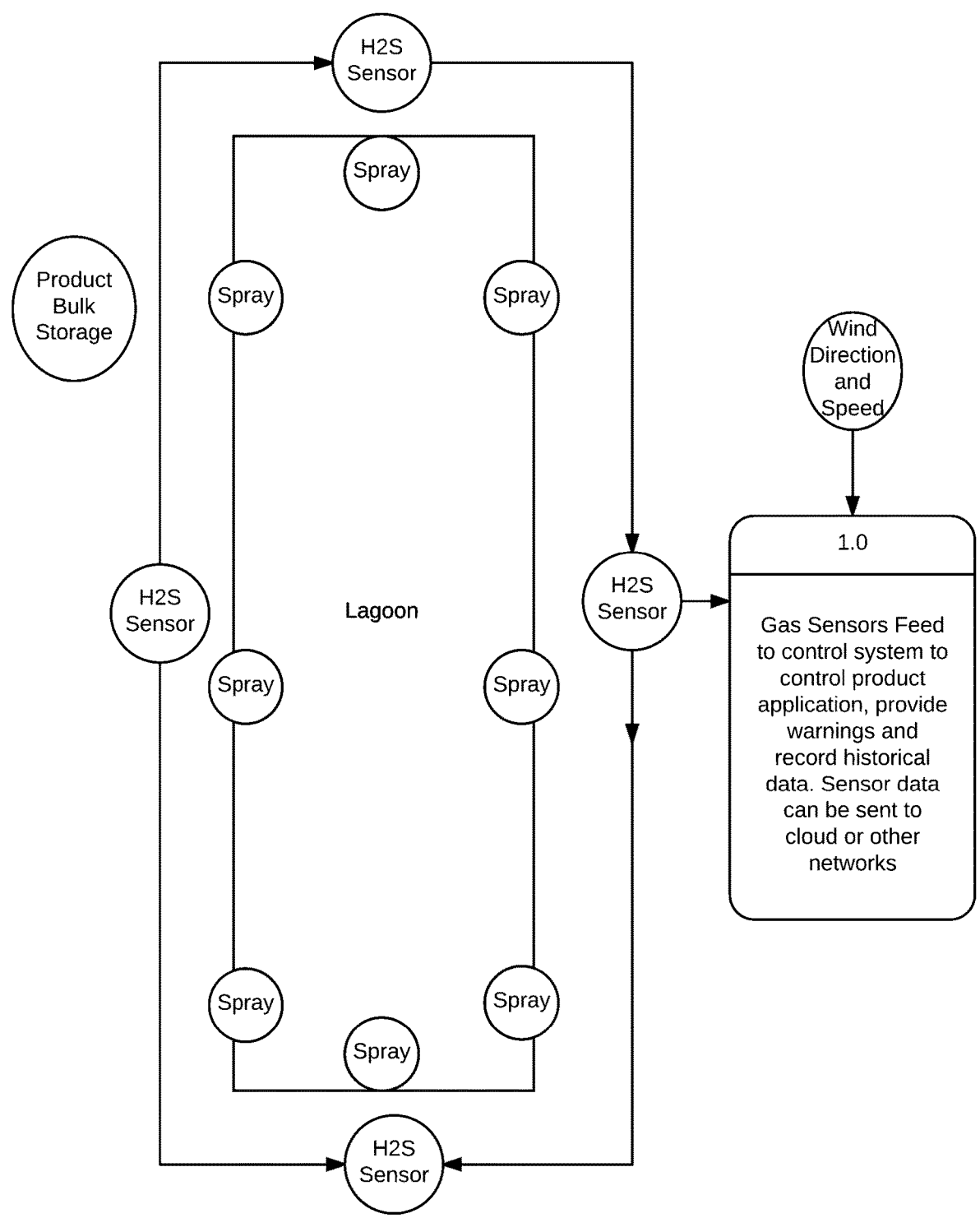
FIG. 4 is a schematic diagram illustrating a control system for detecting and controlling malodorous compounds in a lagoon or pond.

Hydrogen sulfide sensors can be used to provide information to a control system to control odor by automatically applying the humic composition. The control system can include a controller, such as a CPU, and a memory such as a hard drive or flash drive. As shown in FIG. 4, several hydrogen sulfide sensors can be arranged around a lagoon (or other body of water) to detect the quantity of target compound, such as hydrogen sulfide, in the air. Sensors that measure amounts of ammonia, mercaptans, and other malodorous compounds may also be used. The sensors can also alternatively be arranged to measure the quantity of these components in the water. The sensor information can be sent to a control system in which the concentration of the target compound is determined and compared to a threshold concentration to determine whether an additional application of the humic composition is necessary or whether the amount of humic composition that is added should be increased. The memory can store historical data of the target compound concentration as well as the threshold levels of the target compound. The threshold levels can be empirically determined based on levels that are deemed to be tolerable to workers, neighbors, local officials, etc.

The controller can send signals to adjust the amount of humic composition that is sprayed on the pond or that is added to a water stream. As shown in FIG. 4, each lagoon can include multiple spraying stations that are connected to a humic slurry source and can be configured to receive signals from the controller that instruct the spraying station to turn ON/OFF to control application of the liquid humic composition and/or to control how much of the liquid humic composition is applied. For example, where the level of hydrogen sulfide detected by one or more sensor exceeds a predetermined threshold, the controller can send signals to automatically spray a quantity of hydrogen sulfide on the surface of the water. The controller can also send warning signals when the level of the detected target compounds exceeds a threshold level. The signals can initiate a visible warning on a display or an audial warning to let an operator know that additional treatment may be needed.

The system can also include sensors that detect the direction of the wind or the speed of the wind. This allows the system to only apply the humic treatment composition as needed. For example, depending on the set up of the factory or farm, if the wind is blowing in a certain direction there may be no need to control the emitted odor if there are no residences in that direction. Thus, the control system may restrict application of the humic treatment composition to instances where the wind is blowing in a certain direction or above a threshold wind speed.

Figure 5:
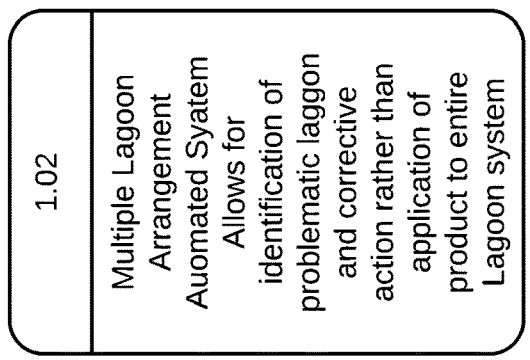
FIG. 5 is a schematic diagram illustrating a process that employs multiple lagoons.
Figure 5:
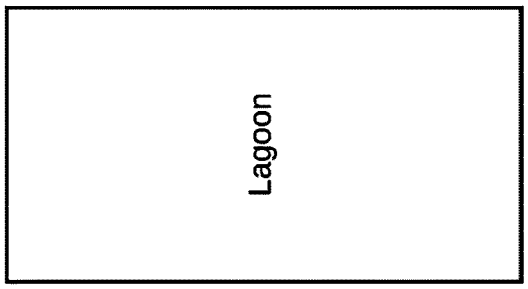
Figure 5:
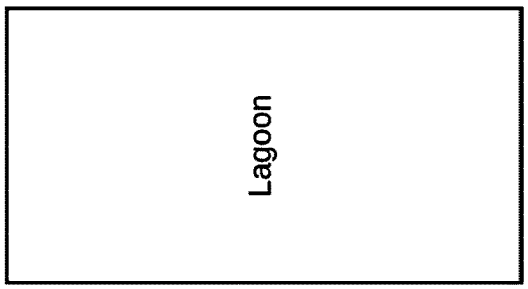
Figure 5:
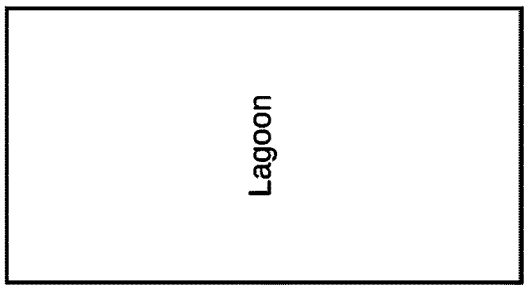
Figure 5:
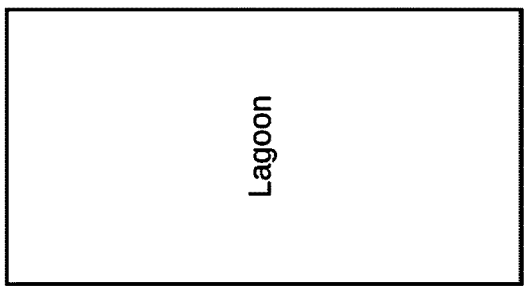

FIG. 5 illustrates a water system with multiple holding areas or lagoons. In such systems the lagoons can be arranged either independent from each other or arranged in series, and sensors can be arranged at each lagoon. This allows the operator or the control system to determine which lagoons have odor problems and to apply the humic treatment composition only to those lagoons that are deemed to be problematic.

EXAMPLES

Trial 1

OC9104 was tested for odor control at a beet sugar pond in Idaho. Neighbor complaints from odors from the factory ponds necessitated a chemical solution to reduce or eliminate odors as well as neighbor complaints. The pond in the trial was the mud excess pond which water was transferred to the flume excess pond eventually. This system was determined to be the major source of objectionable odors, and in particular $H_2S$ was determined to be the primary malodorous component that was being generated. In the trial, a pump was set up to pull water from the pond, inject OC9104 at a target rate of 50 ppm (v/v) of flow, and then return the diverted water to the pond. After about 2 days of operation, odor complaints from the surrounding neighbors diminished significantly. After 5 days of operation, the complaints were gone and the offensive odors within close proximity to the pond were faint to non-existent.

Trial 2

OC9104 was tested for odor control at beet sugar ponds in Montana and Wyoming. In one pond, a metering pump was set up to meter in the OC9104 to the supply stream going to the pond at about 25 ppm (v/v). Due to a piping failure a week or so into the trial, the volume of the tote was emptied into the supply stream and into the pond. It was estimated to be 35 ppm. This trial occurred mid-spring before the ponds got very active. No complaints were noted from neighbors after this event.

In the second pond, OC9104 was fed to an upstream pond, which flows into the second pond, through a metering pump at a pre-calculated rate of 50 ppm based on the volume of the upstream pond, hoping that natural circulation and aerators would distribute the product sufficiently. Although odors were reduced, complaints were still an issue.

Trial 3

Another set of experiments were conducted at beet sugar ponds at the same factories as in Trial 2. For these experiments, the ponds were quickly charged with OC9104. In the first pond, the OC9104 was added to the supply stream at a target of 50 ppm (v/v). In the second pond, OC9104 was added to the pumped recirculation at a target of 50 ppm. Both factories had almost no complaints from surrounding neighbors or the community.

Experimental Example 1

A 5 gallon bucket of water was collected from each of two sugar factories, and the lid was maintained on the bucket over a few days in warm temperatures until gases nearly caused the lid to pop off. The $H_2S$ content in each bucket was tested using glass dragger tubes. In on bucket, the $H_2S$ content was 30 ppm, and in the other bucket it was up to 50 ppm. Each bucket was dosed with OC9104 (the exact dosage was not recorded). After dosing, each bucket was tested again for $H_2S$ content. In each bucket, the $H_2S$ content was zero after the initial dosing of OC9104. The buckets were then re-capped for 3 or 4 days, and then the $H_2S$ content was tested again. Each bucket was still at 0 ppm of $H_2S$.

Excremental Example 2

Mud pond samples from beet sugar factories were collected and tested in the laboratory for odor control. The samples were first tested for $H_2S$ content using a low range Odalog, which measures $H_2S$ in the range of from 0 to 2.00 parts per million. The pails tested had $H_2S$ content of 3.4 ppm and 4.7 ppm $H_2S$, which is over the limit on the Odalog instrument. Even when the pails were given time to expel any trapped gas, the contents still tested over the 2.0 ppm limit. The samples in the pails were observed to be very active. The BOD levels were around 11,000 when the samples were collected and the pH was 5.91.

An initial 17 ppm dose of OC9104 (which was based on an approximately 60 million gallon mud pond and a treatment dose of 1,000 gallons) was added to the sample, which corresponds to about 0.4 mL of treatment slurry per 5 gallon bucket of water. The observable $H_2S$ concentration went immediately to zero and remained at zero for several days in the closed 5 gallon bucket.

What is claimed is:

1. A method of controlling odor in water, the method comprising:
   collecting the water in a holding area;
   adding a liquid humic composition to the water by spraying the humic composition over the surface of the water in the holding area;

then allowing the humic composition to settle toward the bottom of the holding area; and then removing a portion of remaining supernatant water from the holding area.

2. The method of claim 1, wherein the water in the holding area is substantially still or stagnant.

3. The method of claim 1, wherein the humic composition is added in an amount in the range of 0.1 ppm to 100 ppm (wt. solids/wt. water).

4. The method of claim 3, wherein the humic composition is added in an amount in the range of 0.5 ppm to 10 ppm (wt. solids/wt. water).

5. The method of claim 1, wherein the holding area is provided as a tank, a pool, a pond, or a lagoon.

6. The method of claim 1, further comprising detecting the presence of a malodorous compound in or around the holding area, the malodorous compound being selected from one or more of hydrogen sulfide, ammonia, and a mercaptan.

7. The method of claim 6, further comprising determining a concentration of the malodorous compound that is detected and adding the humic composition to the water in the holding area if the determined concentration exceeds a predetermined threshold value.

8. A method of controlling odor in a water system, the method comprising:
   washing vegetables with water;
   then collecting the water that is used to wash the vegetables in a holding area;
   adding a humic composition to the water by distributing the humic composition onto the surface of the water in the holding area;
   allowing the humic composition to settle toward the bottom of the holding area; and
   then drawing a portion of remaining supernatant water from the holding area and contacting the vegetables with the supernatant water.

9. The method of claim 8, wherein the water system includes a first stream that feeds water into the holding area, and the method further comprises adding humic composition to the first stream.

10. The method of claim 9, wherein the humic composition is added to the first stream after the step of adding the humic composition to the water in the holding area.

11. The method of claim 8, wherein the vegetables are sugar beets.

12. A system for controlling odor in a body of water, the system comprising:
   at least one sensor that is configured to detect a malodorous compound and provide a detection result;
   a controller that is configured to receive the detection result from the sensor and determine whether the detection result exceeds a predetermined threshold level; and
   a humic composition supply station that is arranged to spray a liquid humic composition over the surface of the body of water and to control an amount of the humic composition added to the water based on signals received from the controller.

13. A method of controlling odor in a water system in which water contacts food items, the method comprising:
   adding a liquid humic composition to the water,
   wherein the liquid humic composition is substantially free of added suspension agents.

* * * * *